W. S. BIDLE & J. A. COSTELLO.
MACHINE FOR MAKING NUT BLANKS.
APPLICATION FILED AUG. 15, 1913.
1,147,364.
Patented July 20, 1915.
5 SHEETS—SHEET 1.
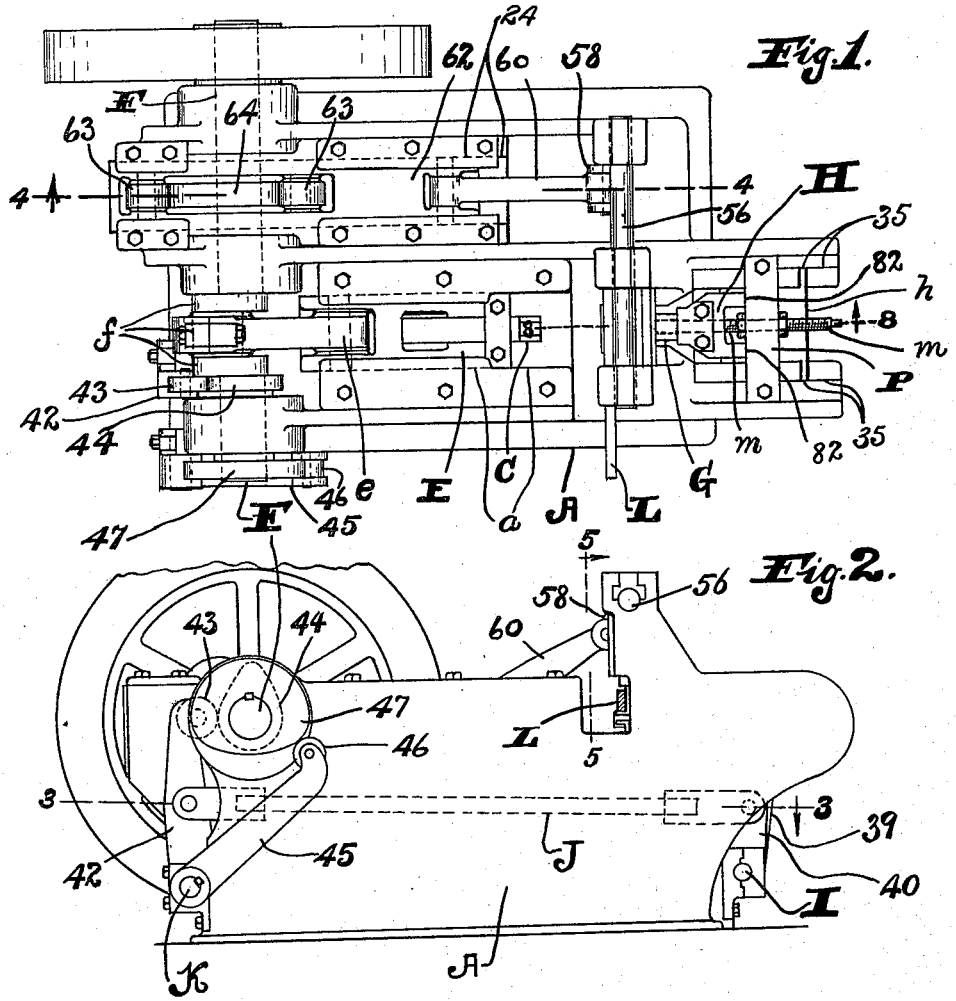
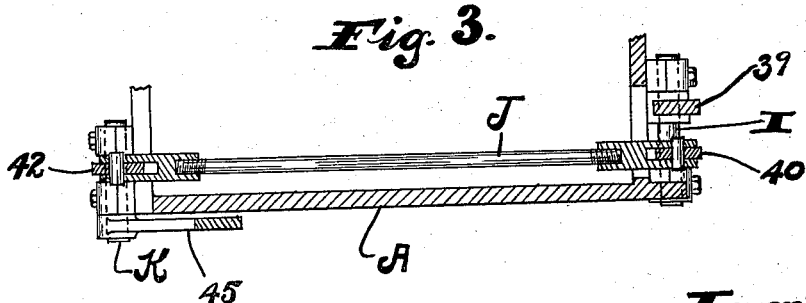

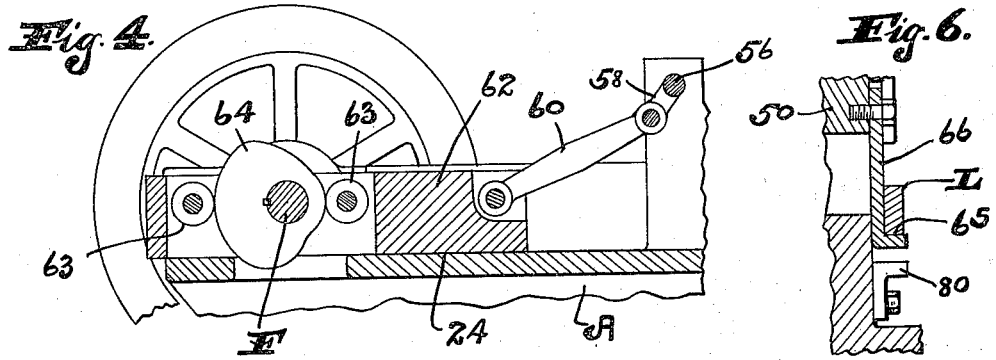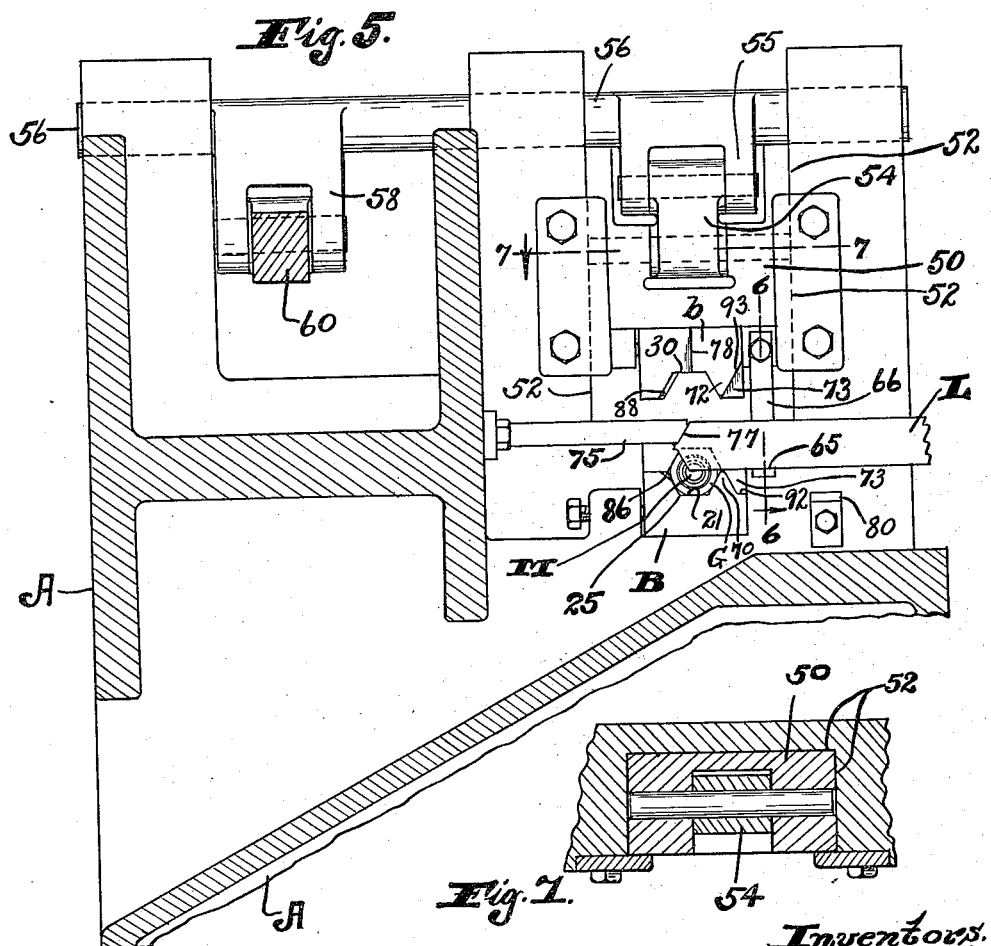

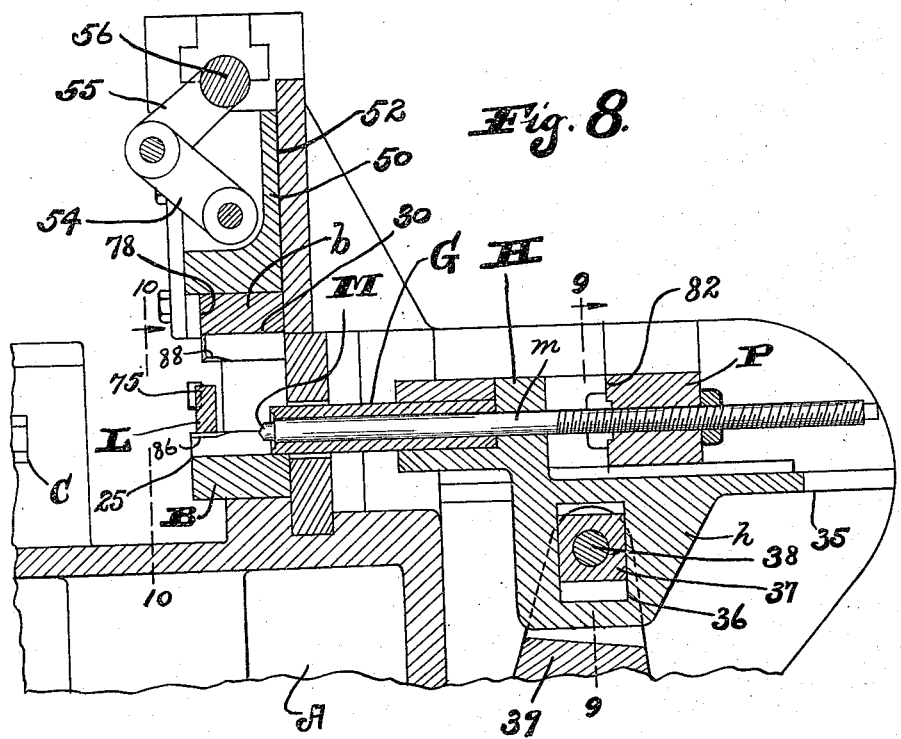
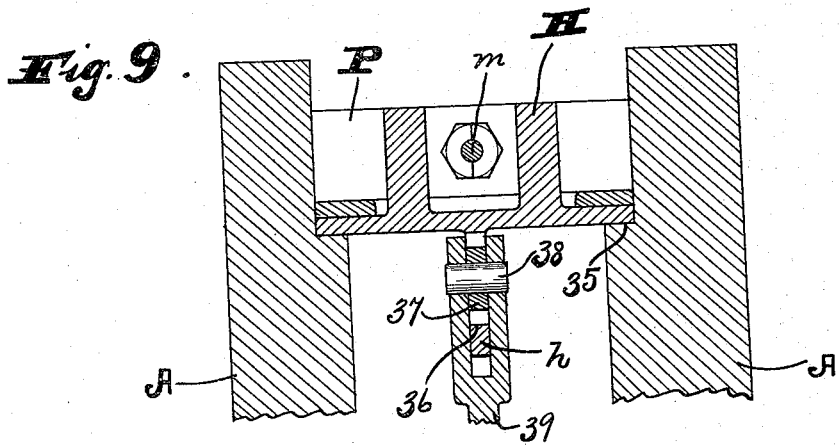

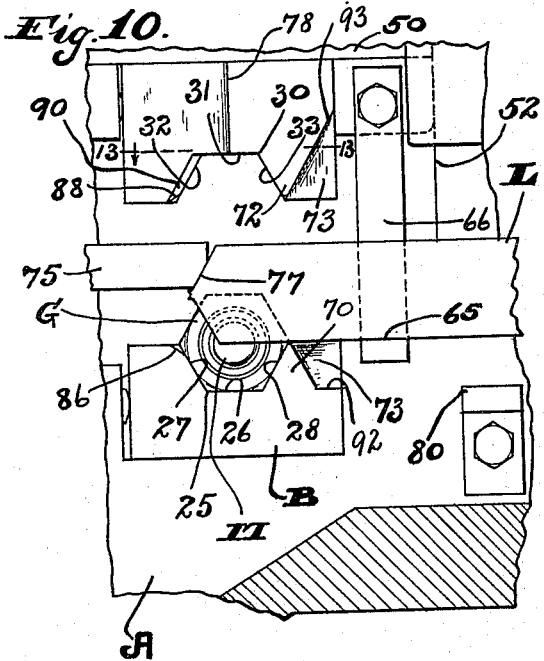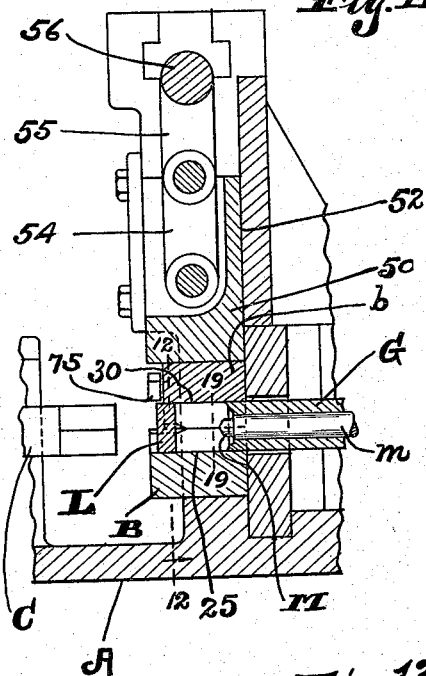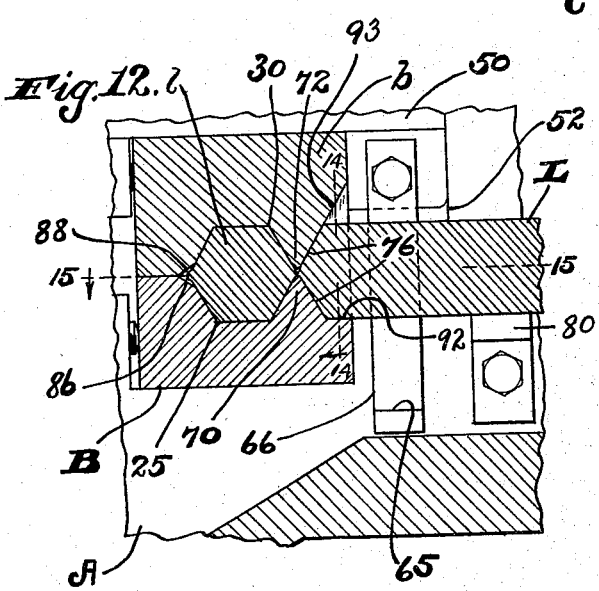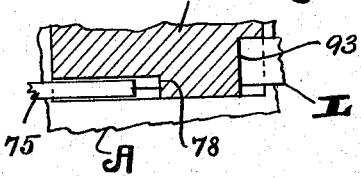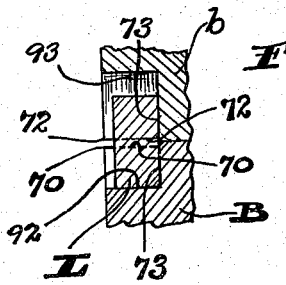

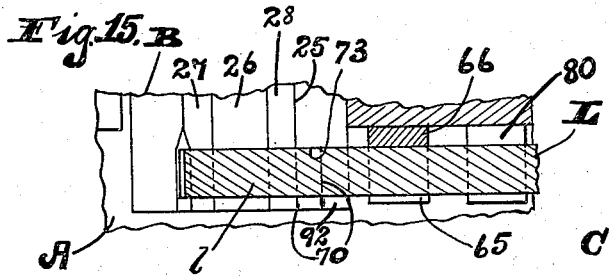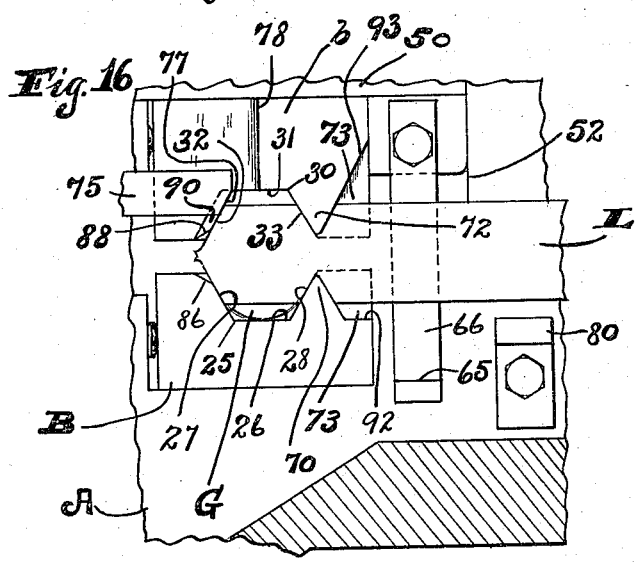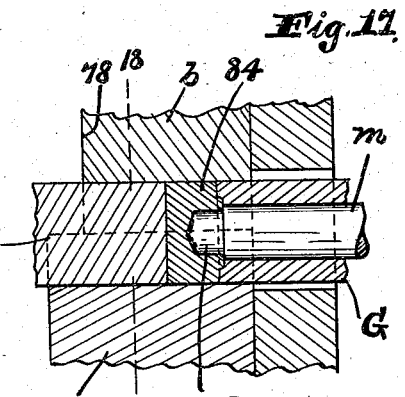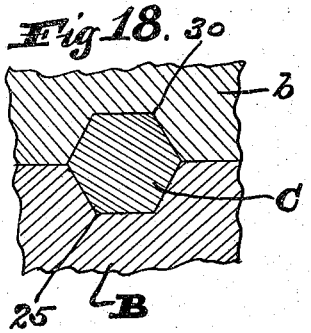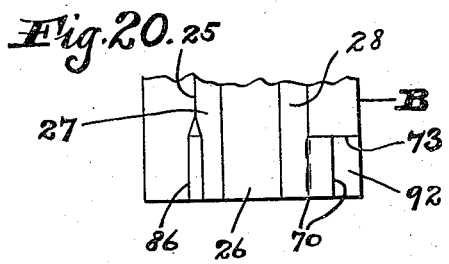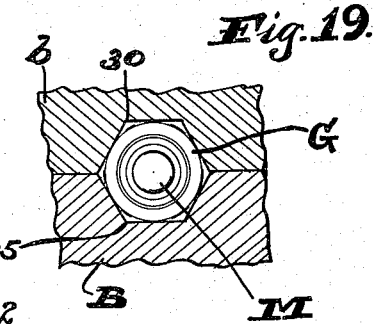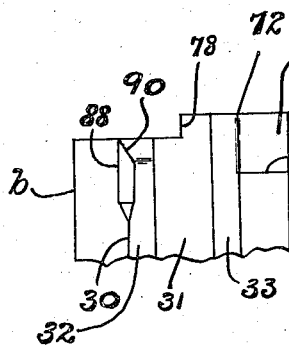

UNITED STATES PATENT OFFICE.

WILLIAM S. BIDLE AND JOSEPH A. COSTELLO, OF CLEVELAND, OHIO.

MACHINE FOR MAKING NUT-BLANKS.

1,147,364. Specification of Letters Patent. Patented July 20, 1915.

Application filed August 15, 1913. Serial No. 784,855.

*To all whom it may concern:*

Be it known that we, WILLIAM S. BIDLE and JOSEPH A. COSTELLO, citizens of the United States of America, residing at Cleveland, in the county of Cuyahoga, State of Ohio, have invented a certain new and useful Improvement in Machines for Making Nut-Blanks; and we do hereby declare the following to be a full, clear, and exact description of the invention, such as will enable others skilled in the art to which it pertains to make and use the same.

This invention relates to improvements in machines for making hot-pressed nut-blanks, and pertains more especially to a machine for pressing a piece of hot metal into a nut-blank which has the external shape and dimensions of a finished hexagonal nut.

One object of this invention is to effect the reduction to a minimum of the amount of metal required in the production of hexagonal nut-blanks which are accurately formed.

Another object is to produce a hot-pressed nut-blank which not only has the external shape and dimensions of a finished hexagonal nut but has an axially extending circular cavity arranged at and centrally of one end face of the nut and is uniform circumferentially of said cavity.

Another object is to produce a machine of the character indicated which is reliable in its operation and not liable to get out of order.

With these objects in view, and to the end of attaining any other advantage hereinafter appearing, this invention consists in certain features of construction, and combinations and relative arrangement of parts, hereinafter described, pointed out in the claims, and illustrated in the accompanying drawings.

In said drawings, Figure 1 is a top plan of a machine embodying our invention. Fig. 2 is a side view. Fig. 3 is a horizontal section of a portion of the machine, the section being taken along the line 3—3, Fig. 2, looking downwardly. Fig. 4 is a vertical section on line 4—4, Fig. 1. Fig. 5 is a vertical section on line 5—5, Fig. 2, looking in the direction indicated by the arrow. Fig. 6 is a vertical section on line 6—6, Fig. 5. Fig. 7 is a horizontal section on line 7—7, Fig. 5, looking downwardly. Fig. 8 is a vertical section on line 8—8, Fig. 1. Fig. 9 is a vertical section on line 9—9, Fig. 8. Fig. 10 is a vertical section of a portion of the machine, the section being taken along the line 10—10, Fig. 8, looking in the direction indicated by the arrow. Fig. 11 is a vertical section showing a portion of Fig. 8, but in Fig. 11 the upper and movable die-section is shown lowered against the lower die-section, whereas Fig. 8 shows the upper die-section withdrawn the maximum distance from the lower die-section. Fig. 12 is a vertical section on line 12—12, Fig. 11, looking in the direction indicated by the arrow. Fig. 13 is a horizontal section on line 13—13, Fig. 10, looking downwardly. Fig. 14 is a vertical section on line 14—14, Fig. 12, looking in the direction indicated by the arrow. Fig. 15 is a horizontal section on line 15—15, Fig. 12, looking downwardly. Fig. 16 is a vertical section corresponding with Figs. 10 and 12, except that in Fig. 16 the upper die-section is shown during its descent instead of in its lower position, as shown in Fig. 12, or upper position, as shown in Fig. 10. Fig. 17 is a vertical section taken centrally and longitudinally of the die when the upper die-section has been lowered against the lower die-section and shows a piece of hot metal pressed into a nut-blank. Fig. 18 is a transverse vertical section on line 18—18, Fig. 17. Fig. 19 is a transverse vertical section on line 19—19, Fig. 11, looking toward the ejector G. Fig. 20 is a top plan of a portion of the lower die-section. Fig. 21 is a bottom plan of a portion of the upper die-section. Figs. 8, 9, and 11 are drawn on a larger scale than Figs. 1, 2, 3, 4, 5, 6 and 7, and Figs. 10, 12, 13, 14, 15, 16, 17, 18, 19, 20, and 21 are drawn on a larger scale than Figs. 8, 9 and 11, and portions are broken away in the drawings to reduce their size.

Referring to said drawings, A indicates the bed of our improved machine which (see Figs. 5, 8, 10, 11, 12, 14, 15, 16, 17, 18, and 19) comprises a substantially horizontally arranged tubular die consisting of a lower stationary section B and an upper section *b* which is movable from and against the lower die-section. The lower die-section is secured to the bed in any approved manner and is arranged substantially horizontally and provided in the top thereof with a recess 25 extending endwise through said die-section. Said recess (see Figs. 10, 15, 16 and 20) has a substantially horizontally arranged bottom wall 26 and two side walls 27 and 28 which diverge upwardly. The upper die-section is arranged substantially horizontally and is provided in the bottom thereof with a recess 30 which extends endwise through said die-section. The recess 30 (see Figs. 10, 16 and 21) has a substantially horizontally arranged top wall 31 and two side walls 32 and 33 which diverge downwardly. It will be observed therefore that the die-sections are parallel, that the recesses 25 and 30 are directly opposite, that the upper and movable die-section has such arrangement relative to the lower and stationary die-section, and said recesses have such contour in cross-section, that when the upper die-section has been lowered against the lower die-section, as shown in Figs. 11, 12, 18 and 19, said recesses form the metal-receiving hole in the die formed by said die-sections, which hole is hexagonal in cross-section and adapted to receive a hot metal piece which is to be pressed into a hexagonal nut-blank having the external shape and dimensions of a finished hexagonal nut. In other words, said die when its upper section $b$ is closed against its lower section B is contoured internally in cross-section to conform to the external contour of a finished hexagonal nut in cross-section, and said die is not only hexagonal internally in cross-section but divided longitudinally at opposite internal corners thereof,—that is, at opposite corners of the metal-receiving hole in the die,—into two sections each of which carries three of the internal walls of the die and a recess which forms one half of said hole.

The upper die-section is supported and actuated as will hereinafter appear and shown in its upper position in Figs. 5, 8 and 10 in which said die-section is spaced the maximum distance from the lower die-section.

A horizontally arranged endwise movable plunger C extends the maximum distance into the hereinbefore mentioned die from the metal-receiving end of the die, as shown in Fig. 17, or is spaced the maximum distance from said die, as shown in Figs. 1 and 8, according as the plunger is in the one or the other of its extreme positions. Said plunger is of course contoured externally in cross-section (see Fig. 18) to conform to the internal contour of the die in cross-section when the upper die-section has been lowered against the lower die-section. Said plunger is carried by and suitably secured to a correspondingly arranged slide E which (see Fig. 1) is movable toward and from the die B and engages a correspondingly arranged slideway $a$ formed in the bed A. The slide E is actuated in any approved manner, being shown operatively connected by a pitman or link $e$ with the crank $f$ of a suitably supported shaft F which is arranged horizontally and at a right angle to the travel of said slide.

As already indicated, the plunger C is adapted to enter the metal-receiving end of the die and feed a piece of hot metal within and endwise of the die, and a horizontally arranged endwise movable blank-ejector G extends in any position thereof into the die from the opposite end of the die. Said ejector is movable endwise of the die and in its extreme rearward position, shown in Figs. 8, 11 and 17, is spaced far enough from the metal-receiving end of the die to permit the insertion, a suitable distance forwardly of the ejector, of the hot metal piece to be operated on within the die. Said ejector has its forward end face contoured as required to form a crown-face on the adjacent end of the blank to be formed within the die and is of course contoured (see Figs. 5, 10 and 19) to conform to the internal contour of the die in cross-section. Said ejector extends the minimum distance into the die in the extreme rearward position of the ejector. Said ejector extends into and is suitably secured to and consequently carried by a correspondingly arranged slide H which (see Figs. 1, 8 and 9) is movable toward and from the die and engages a correspondingly arranged slideway 35 formed in the bed A. The slide H is actuated in any approved manner, having a downwardly projecting member $h$ which is shown provided (see Figs. 8 and 9) with a lateral slot 36 engaged by a block 37 which is movable somewhat up and down said slot and shown pivoted, as at 38, to the upper end of an upwardly projecting arm 39 (see also Figs. 2 and 3) of a suitably supported shaft I which is arranged horizontally and parallel with the shaft F. The shaft I (see Figs. 2 and 3) is also provided with an upwardly projecting arm 40 operatively connected with a rod J which is operatively connected with the upwardly projecting arm 42 of a rock-shaft K which is parallel with and arranged below the shaft F. The arm 42 is provided at its upper end with a roller 43 engaging the circumferential or working surface of a cam 44 with which the shaft F is operatively provided, as shown in Figs. 1 and 2. The shaft K is also provided with an arm 45 which projects upwardly and in the direction of the slideway $a$ and is provided at its upper end with a roller 46 which engages the circumferential or working surface of a cam 47 with which the shaft F is operatively provided, as shown in Figs. 1 and 2.

The upper die-section (see Figs. 5, 7, 8 and 11) is carried by a slide 50 to which said die-section is secured in any approved manner. The slide 50 is arranged to move in a vertical plane and engages a correspondingly vertically arranged slideway 52 formed in any approved manner. The slide 50 is operatively connected by a link 54 with the arm 55 of a suitably supported shaft 56 which is arranged horizontally above the travel of said slide. The shaft 56 is parallel with the shaft F. The arm 55 projects downwardly from the shaft 56, and the link 54 projects upwardly from the slide 50. Upon reference to Fig. 8 it will be observed that in the upper position of the upper die-section the shaft-arm 55 and the link 54 are arranged at an angle to each other, and that upon the descent of said slide to lower the upper die-section against the lower die-section the link 54 and the shaft-arm 55 are arranged vertically, as shown in Fig. 11.

The shaft 56 (see Figs. 1, 4 and 5) is provided with another arm 58 which is operatively connected by means of a link 60 with a slide 62 which is parallel with the slide E and consequently arranged to move in a horizontal plane and engages a correspondingly arranged slideway 24 formed in the bed A. The slide 62 (see Figs. 1 and 4) is provided with two rollers 63 which are parallel with the shaft F and arranged at opposite sides respectively of and engaged by a cam 64 operatively mounted on the shaft F so that said slide is reciprocated by said cam during the rotation of said shaft.

The hot bar or stock L is fed endwise to and between the die-sections from one side of the die when the upper die-section is in its upper position, as illustrated in Figs. 5, 8 and 10, which show said stock arranged horizontally and at a right angle to the path of the plunger C and resting on a seat 65 which is formed on a hanger 66 which (see Figs. 5, 6 and 10) depends from and is suitably secured to the slide 50 and arranged between the die and the point whence the stock is fed toward the die. The slide 50 is therefore provided with a seat 65 affording support to the stock L during the feeding of the stock between the die-sections when the upper die-section is in its upper position and consequently spaced the maximum distance from the lower die-section, and the relative arrangement of the parts is such that said seat is arranged substantially in the same plane horizontally with the top of the lower die-section when the upper die-section is in said position.

The recess 25 in the lower die-section (see Figs. 10, 15, 16 and 20) has its side wall 28 which faces in the direction in which the hot stock is fed to and between the die-sections forming, at the metal-receiving end of the die, one side of a tooth 70 arranged between said recess and the hanger 66 and extending transversely of and across the under side of the path of said stock, as shown in Figs. 14 and 15.

The recess 30 in the upper die-section (see Figs. 10, 16 and 21) has its side wall 33 which faces in the direction in which the hot stock is fed to the die forming, at the metal-receiving end of the die, one side of a tooth 72 arranged between said recess and the hanger 66 and extending over and transversely of and across the path of said stock, as shown in Fig. 14. The teeth 70 and 72 are arranged directly opposite and project toward each other.

Each die-section is provided at the outer side of its tooth (see Figs. 5, 10, 15, 16, 20, and 21) with a vertically arranged surface 73 arranged between the path of the hot stock and the ejector-receiving end of the die but next to said path and consequently arranged to form a lateral abutment for said stock during the movement of the upper die-section against the lower section, and we would here remark that the hanger 66 has its side which faces said path arranged between the path of the stock and the ejector-receiving end of the die but next to said path and consequently forms a lateral abutment for and participates in properly guiding the stock relative to the die.

The bed A is shown provided with a stop-forming member 75 arranged (see Figs. 5, 8, 10, 11, 13 and 16) to limit the forward movement of the hot stock when the stock has been fed the required distance between the die-sections, and said stop-forming member extends somewhat over the recess 25 in the lower die-section.

The tooth 72 of the upper die-section during the descent of said die-section, after the hot stock has been fed against the stop-forming member 75, comes into contact with the top of the stock and enters and thereby recesses the stock and forces the stock downwardly so as to cause the stock to be entered and recessed from below by the tooth 70 of the lower die-section. The seat 65, being carried by the slide 50, of course permits the descent of the stock during the lowering of the upper die-section.

It will be observed that both sides of the tooth of each die-section are arranged at the same angle relative to a vertical plane so that said tooth upon entering the hot stock forms a V-shaped recess 76 in the stock, (see Fig. 12) which recess extends from side to side of and consequently through the stock. Obviously the two recesses 76 simultaneously formed in the hot stock by the teeth 70 and 72 have those side walls thereof which face in the direction of the rear end of the stock forming two adjacent sides of the hexagonal hot metal piece $l$ next to be operated on to form a desired nut-blank, whereas the other side walls of said recesses form two adjacent sides of the hexagonal portion next to be formed on the stock, and obviously the stock, to form the first hexagonal portion thereon has its forward end shaped in any approved manner to form two adjacent sides of said hexagonal portion and consequently has the lower portion and upper portion of its forward end face sloping and converging in the direction of the stop-forming member 75 and substantially parallel with the outer side of the lower tooth 70 and upper tooth 72 respectively. The stop-forming-member 75 has its forward end face 77 sloping so as to face downwardly and toward the path of the stock and substantially parallel with the outer side of the upper tooth 72 and forming a suitable abutment for the upper sloping portion of the forward end face of the stock upon feeding the stock into position between the two die-sections preparatory to the lowering of the upper die-section against the lower die-section.

The hot stock is inserted, as already hereinbefore indicated, endwise between the two die-sections substantially at a right-angle to the metal-receiving hole in the die when the upper die-section has been withdrawn the maximum distance from the lower die-section and is shown inserted between the die-sections as required in Figs. 5, 8 and 10, and the upper die-section is recessed or cut away at the metal-receiving end of the die, as at 78, (see Fig. 13) to accommodate the location of the stop-forming member 75 in the lower position of said upper die-section.

By the construction hereinbefore described it will be observed that our improved machine for making hot-pressed hexagonal nut-blanks comprises a die having the metal-receiving hole hexagonal in cross-section, that said die is divided longitudinally at opposite corners of said hole into two sections each of which carries three walls of said hole and a recess equal to one-half of said hole, that said die is provided at its metal-receiving end with two oppositely arranged teeth which project toward each other and are formed on the movable section and stationary section respectively at one and the same side of the die, but the inner side of the tooth of each die-section and one side wall of the recess in said section are substantially coincident, that the outer side of said tooth and the other side wall of said recess are substantially parallel, and that the tooth of the movable die-section is spaced far enough from the tooth of the stationary die-section when the movable die-section has been withdrawn the maximum distance from the stationary die-section to permit the insertion of hot stock endwise between said teeth substantially at a right angle to the aforesaid hole.

Obviously the entering of the hot stock by the teeth 70 and 72 of the die-sections causes the hexagonal portion thereby being formed on the stock forward of the recesses made in the stock by said teeth during the descent of the upper die-section to be completely surrounded by the die when the upper die-section has been lowered against the lower die-section and to be positioned as required preparatory to being removed by the plunger in the direction of the ejector G. We would here remark that the bed A (see Figs. 5, 10, 12, 15 and 16) is provided between the seat 65 and the rear end of the stock with a stationary seat 80 for the stock, which seat is arranged to afford support to the stock when the stock has been lowered upon the descent of the upper die-section against the lower die-section.

To insure contact with all the walls and more especially with the walls 27 and 32 of the metal-receiving hole in the die by the hexagonal piece removed from the hot stock to be pressed into a hexagonal nut-blank within the die, the stop-forming member 75 is spaced such a distance from the path of the tooth of the movable die-section in the direction in which the stock is fed that the stock is fed beyond the biting edges of the teeth somewhat farther than the distance between opposite internal corners of the metal-receiving hole in the die so that during the descent of the upper die-section, as shown in Fig. 16, those of the aforesaid walls which face in the direction opposite to the direction in which the stock is fed exert pressure against the sloping portions of the forward end face of the stock. Fig. 16 shows the point at which said last-mentioned internal walls of the die begin to press against the hexagonal metal piece being formed during the descent of the movable die-section.

A stationary metal core M (see Figs. 5, 8, 10, 11, 17, and 19) is arranged centrally and longitudinally of the die between the travel of the plunger and the ejector-receiving extremity of the die and centrally of the forward end face of the ejector. Said core is parallel with said die and extends forwardly of the ejector G in the extreme rearward position of the ejector. Said core is circular in end view and has its forward end tapering toward its free extremity. Said core is small enough transversely to permit movement of the ejector endwise of the core. Said core is formed on the forward end of a metal rod $m$ which is arranged within the ejector G and extends loosely through said ejector and loosely through the slide H (see Fig. 8). The rod $m$ also extends (see Figs. 1 and 8) through a cross-bar P which is arranged horizontally and at a right angle to the travel of the slide H and secured to the bed A in any approved manner. Said cross-bar is therefore stationary and arranged to form a stop for limiting the rearward movement of the slide H which is shown provided (see Fig. 1) with two rearwardly facing shoulders 82 arranged at opposite sides respectively of the rod $m$ and abutting against the forward or inner side of said cross-bar in the extreme rearward position of the slide. The rod m is attached to and rendered rigid with the cross-bar P in any approved manner.

By the construction hereinbefore described it will be observed that the rod m, and consequently the core M, are stationary; that the ejector G is operatively connected by mechanism comprising the slide H and the operative connection between said slide and the rock-shaft K with the arm 42 of the shaft K to effect the forward or blank-ejecting movement of the ejector, and that the arm 45 of said rock-shaft is arranged to be actuated by the cam 47 of the shaft F to effect the rearward movement of the ejector.

Fig. 17 shows the plunger as having moved the maximum distance into the die and shows a nut-blank 84 formed within the die, and obviously the hot metal piece to be pressed into such a blank is of course large enough in dimensions to cause it upon being pressed against and around the core M to completely fill the space around said core from end to end of the core in the extreme rearward position of the ejector, and the relative arrangement of the parts is such that the die, the forward end of the ejector in the extreme rearward position of the ejector, the core and the plunger C coöperate in pressing said hot metal piece into a hexagonal nut-blank having a cavity (formed by the core M) arranged centrally of an end-face of the blank and extending axially of the blank from said face. The core M is arranged to form an abutment for the hot metal piece fed endwise of the die by the plunger during the forward or feeding movement of the plunger before the plunger has completed said movement, and the core, the ejector, the die and the plunger are relatively arranged as required to effect the formation, upon the completion of said movement of the plunger, of a closed chamber which has the dimensions of the nut-blank to be made and is occupied by the nut-blank formed during said movement of the plunger.

The mechanism hereinbefore described for operating the plunger, the hereinbefore described mechanism for operating the blank-ejector and the mechanism hereinbefore described for actuating the slide 50 are so relatively arranged and timed that the ejector is moved forwardly to eject the blank from the die during the receding movement of the plunger upon the formation of the blank; that the plunger recedes far enough during the blank-ejecting movement of the ejector to permit the blank to be freely ejected from the die by the ejector; that the ejector shall have moved forwardly and ejected the blank from the die upon the last-mentioned movement of the plunger; that upon the formation of a blank within the die as hereinbefore described the slide 50 and connected upper die-section begin to ascend preparatory to the ejecting stroke of the ejector to enable the ejector to freely move endwise of the die during the ejecting operation, and that the upper die-section has been lowered against the lower die-section and the ejector has returned to its extreme rearward position before the plunger has reached the path of the stock during the next forward movement of the plunger, as shown in Fig. 11 which illustrates the plunger as advancing.

The lower die-section (see Figs. 8, 10, 12, 15, 16, and 20) has its internal wall 27 provided at the top of said die-section and opposite the upper portion of the tooth 72 of said die-section with a recess 86 which extends longitudinally of said section and transversely of the forward end of the path of the hot stock and somewhat beyond said path in the direction of the ejector-receiving end of the die, which recess is reduced in depth beyond said path in said direction, as shown in Fig. 8, and reduced in width beyond said path in said direction, as shown in Figs. 15 and 20. The upper die-section (see Figs. 8, 10, 12, 16, and 21) has its internal wall 32 provided at the bottom of said die-section with a recess 88 which extends longitudinally of said section and transversely of the forward end of the path of the hot stock and somewhat beyond said path in the direction of the ejector-receiving end of the die, which recess is reduced in depth beyond said path in said direction, as shown in Fig. 8, and reduced in width beyond said path in said direction, as shown in Fig. 21. Said recesses 86 and 88 are in registry and freely accommodate any projection or irregularity at the central portion of the forward end face of the hot stock.

The internal wall 32 of the movable die-section has a beveled forward end-portion 90 (see Figs. 10, 16 and 21) which is adapted to facilitate the passage within and endwise of the die of such portion of the hot metal piece to be pressed into the form of a nut-blank as is not engaged during the descent of the upper die-section by said die-section because of the recessing or cutting away of said die-section on account of the stop-forming member 75. Although the beveled portion 90 of the wall 32 and the recesses 86 and 88 are not absolutely necessary we prefer said recesses as well as said beveled portion of said wall to positively insure the utilization of all the metal in the hot metal piece in the formation of the desired nut-blank and positively prevent any undesirable impediment to an accurate and efficient operation of the machine.

The stationary seat 80 for the stock is preferably suitably spaced from the die as shown, but obviously said seat no longer supports the stock when the latter becomes so short that it no longer extends from the die to and over said seat, and therefore (see Figs. 5, 10, 12, 14, 15, 16, and 20) we have provided the lower die-section at the outer side of the tooth of said die-section with a seat 92 for the stock, which seat is arranged to be engaged by the stock in the lower position of the upper die-section, as shown in Figs. 12, 14 and 15.

The die-sections are made of a special steel which is not inexpensive and are preferably so contoured externally as to require as little machining as possible so as to reduce the cost of the die to a minimum, and (see Figs. 5, 10, 12, and 16) we would call attention more especially to such a contouring of the upper die-section that said die-section has its surface which forms the outer side of the tooth of said die-section extended upwardly, as at 93, across the adjacent portion of the body of said die-section to facilitate the manufacture of said section.

We would here remark that our improved machine essentially comprises such a location of the teeth 70 and 72 of the sections B and b respectively of the die relative to the stationary core M and the travel of the plunger C that the hot metal piece fed into said die by the plunger shall have been pressed into the shape required by and between the plunger and the ejector G only after said piece has been moved inwardly beyond the aforesaid teeth. It will be observed that in our improved machine as illustrated and hereinbefore described, the sections B and b of the die, when they are closed together, are in contact with each other from the face of the ejector in the most rearward position of the ejector to said teeth, that the plunger extends in its extreme forward position into the die beyond said teeth, that the core M extends forwardly of the face of the ejector in the aforesaid position of the ejector a distance measuring less than the distance between said face and said teeth in said position of the ejector, and consequently said teeth are not only arranged between said core and the face of the die but such a distance from said core in the direction of the face of the die that when the plunger during its forward stroke has moved toward said core beyond the inner sides of said teeth, the pressing of the hot piece into the shape required around said core and between the face of the plunger and the face of the ejector has not quite been completed. It will be also observed that our improved construction permits such an adequate thickness in the side walls of the recesses 25 and 30 in the die-sections B and b respectively where said walls extend between the face of the ejector in the most rearward position of the ejector and the teeth 70 and 72 that said walls are fully able to withstand and are not liable to the slightest displacement or yielding by the great pressure required upon the hot metal piece by and between the plunger and the ejector during the forcing of said piece around the core M and against the face of the ejector to positively fill every portion of the interior of the die around said core and between the plunger and the ejector and thereby insure the formation of a nut-blank having the external contour required in an externally perfect hexagonal nut.

What we claim is:—

1. In a machine for making hot-pressed hexagonal nut-blanks, a tubular die hexagonal internally in cross-section and adapted to receive the hot-metal piece to be operated on and divided longitudinally at opposite internal corners thereof into two separable sections; an endwise movable plunger extending the maximum distance into said die from the face of the die or spaced the maximum distance from the die according as the plunger is in the one or the other of its extreme positions, and a tubular ejector extending into said die from the opposite end and movable endwise of the die, said die having its aforesaid sections when they are closed together in contact with each other between the range of movement of the plunger and the face of the ejector in the extreme rearward position of the ejector and being provided with two directly oppositely arranged teeth which project toward each other and are carried by opposite die-sections respectively and suitably spaced upon the requisite separation of said die-sections to permit the insertion of the hot stock endwise between said teeth, one side of the tooth of each die-section and one of the outer internal walls of said section being substantially coincident and the other side of said tooth and the other of said walls being substantially parallel, said teeth being arranged wholly between the forward extremity of the travel of the plunger and the face of the die.

2. In a machine for making hot-pressed hexagonal nut-blanks, a tubular die hexagonal internally in cross-section and adapted to receive the hot-metal piece to be operated on and divided longitudinally into two separable sections, each of which carries three of the internal walls of the die; an endwise movable plunger extending the maximum distance into said die from the face of the die or spaced the maximum distance from the die according as the plunger is in the one or the other of its extreme positions; a tubular ejector extending into said die from the opposite end and movable endwise of the die, and a stationary core arranged centrally and longitudinally of said die and centrally of the ejector and extending forwardly of the ejector in the extreme rearward position of the ejector, said die being provided with two directly oppositely arranged teeth which project toward each other and are carried by opposite sections respectively of the die and suitably spaced when the aforesaid die-sections have been separated the maximum distance, said die-sections when they are closed together being in contact with each other from the face of the ejector in the aforesaid position of the ejector to a point between the forward extremity of the travel of the plunger and the face of the die, one side of the tooth of each die-section and one of the outer internal walls of said section being substantially coincident and the other side of said tooth and the other of said walls being substantially parallel, said teeth being arranged wholly between the face of the die and the aforesaid core.

3. In a machine for making hot-pressed hexagonal nut-blanks, a die which is hexagonal internally in cross-section and divided longitudinally into two sections each of which carries three of the internal walls of the die, one section being movable from and against the other section, said die having two directly oppositely arranged teeth which project toward each other and are carried by opposite sections respectively of the die and suitably spaced when the aforesaid movable die-section has been withdrawn the maximum distance from the other die-section, the inner side of the tooth of each die-section and one of the outer internal walls of said section being substantially coincident and the outer side of said tooth and the other of said outer walls being substantially parallel, and a stop-forming member arranged to arrest the forwardly endwise movement of the stock and spaced far enough from the path of the tooth of the aforesaid movable die-section to permit the stock to be fed the required distance beyond the biting edges of the teeth, said movable die-section being recessed to accommodate the location of said stop-forming member when said movable die-section has been actuated against the other die-section.

4. In a machine for making hot-pressed hexagonal nut-blanks, a die which is hexagonal internally in cross-section and divided longitudinally into two separable sections each of which carries three of the internal walls of the die, said die having two directly oppositely arranged teeth which project toward each other and are carried by opposite sections respectively of the die and suitably spaced when said sections have been separated the maximum distance, the inner side of the tooth of each die-section and one of the outer internal walls of said section being substantially coincident and the outer side of said tooth and the other of said outer walls being substantially parallel, and a stop-forming member extending to the interior of the aforesaid die and arranged to arrest the forwardly endwise movement of the stock and to permit the stock to be fed the required distance beyond the biting edges of the teeth, the die being recessed to accommodate the location of said stop-forming member.

5. In a machine for making hot-pressed hexagonal nut-blanks a horizontally arranged tubular die which is hexagonal internally in cross-section and divided centrally between the top and bottom of the die into two sections each of which carries three of the internal walls of the die, one die-section being movable from and against the other die-section, said die having two directly oppositely arranged teeth which project vertically toward each other and are carried by opposite sections respectively of the die and suitably spaced when the aforesaid movable die-section has been withdrawn the maximum distance from the other die-section, the inner side of the tooth of each die-section and one of the outer internal walls of said section being substantially coincident and the outer side of said tooth and the other of said outer walls being substantially parallel, and a stop-forming member extending over the lower die-section and arranged to arrest the forwardly endwise movement of the stock and spaced far enough from the path of the tooth of the aforesaid movable die-section to permit the stock to be fed the required distance beyond the biting edges of the teeth, the upper die-section being recessed to accommodate the location of said stop-forming member when the movable die-section has been actuated against the other die-section.

6. In a machine for making hot-pressed hexagonal nut-blanks, a horizontally arranged tubular die which is hexagonal internally in cross-section and divided centrally between the top and bottom of die into two sections each of which carries three of the internal walls of the die, the upper section being movable from and against the lower section, said die having two directly oppositely arranged teeth which are carried by opposite sections respectively of the die and suitably spaced when the upper die-section has been withdrawn the maximum distance from the lower die-section, the inner side of the tooth of each die-section and one of the outer internal walls of said section being substantially coincident and the outer side of said tooth and the other of said outer walls being substantially parallel, and a stop-forming member extending somewhat over the lower die-section and arranged to arrest the forwardly endwise movement of the stock and spaced far enough from the path of the tooth of the upper die-section to permit the stock to be fed the required distance beyond the biting edges of the teeth, said stop-forming member having a sloping forward end face which faces downwardly and toward the path of the stock and is substantially parallel with the outer side of the upper tooth and forms an abutment for the upper sloping portion of the forward end face of the stock, and the upper die-section being recessed to accommodate the location of said stop-forming member when said die-section has been actuated against the lower die-section.

7. In a machine for making hot-pressed nut-blanks, a substantially horizontally arranged tubular die which is divided horizontally and centrally of its metal-receiving hole into two sections one of which is movable from and against the other, said die having two directly oppositely arranged teeth which project toward each other and are carried by opposite sections respectively of the die at one and the same side of the die, said teeth being spaced apart far enough when the upper die-section has been withdrawn the maximum distance from the lower die-section to permit the insertion of hot stock endwise between said teeth substantially at a right angle to the aforesaid hole; a movable seat for the stock, and means whereby said seat and the movable die-section are actuated in unison, said seat being arranged to be engaged by the stock when said movable die-section is spaced the maximum distance from the other die-section.

8. In a machine for making hot-pressed nut-blanks, a substantially horizontally arranged tubular die which is divided horizontally and centrally of its metal-receiving hole into two sections, the upper die-section being movable from and against the lower die-section, said die having two directly oppositely arranged teeth which project toward each other and are carried by opposite sections respectively of the die at one and the same side of the die, said teeth being spaced apart far enough when the upper die-section has been withdrawn the maximum distance from the lower die-section to permit the insertion of hot stock endwise between said teeth substantially at a right angle to the aforesaid hole; a movable seat for the stock, and means whereby said seat and the upper die-section are actuated in unison, said seat being arranged to be engaged by the stock when the upper die-section is spaced the maximum distance from the lower die-section.

9. In a machine for making hot-pressed nut-blanks, a substantially horizontally arranged tubular die which is divided horizontally and centrally of its metal-receiving hole into two sections and has two directly oppositely arranged teeth which project toward each other and are carried by opposite sections respectively of the die at one and the same side of the die, said teeth being spaced apart far enough when the upper die-section has been withdrawn the maximum distance from the lower die-section to permit the insertion of hot stock endwise between said teeth substantially at a right angle to the aforesaid hole; a suitably actuated substantially vertically movable slide carrying the upper die-section, and a hanger depending from and secured to said slide and arranged between the die and the point whence the stock is fed toward the die, said hanger being provided with a seat arranged to be engaged by the stock when the upper die-section is spaced the maximum distance from the lower die-section.

10. In a machine for making hot-pressed nut-blanks, a substantially horizontally arranged tubular die which is divided horizontally and centrally into two sections, the upper die-section being movable from and against the lower die-section, said die having two directly oppositely arranged teeth which project toward each other and are carried by opposite sections respectively of the die at one and the same side of the die, said teeth being spaced apart far enough when the upper die-section has been withdrawn the maximum distance from the lower die-section to permit the insertion of hot stock endwise between said teeth substantially at a right angle to the aforesaid hole, a hanger arranged between the die and the point whence the stock is fed toward the die and provided with a seat arranged to be engaged by the stock when the upper die-section is spaced the maximum distance from the lower die-section, said hanger extending between the path of the stock and the ejector-receiving end of the die and arranged to form a guide for the stock, and means whereby said hanger and the upper die-section are actuated in unison.

11. In a machine for making hot-pressed nut-blanks, a substantially horizontally arranged tubular die adapted to receive a plunger at one end and an ejector at the other end, which die is divided horizontally and centrally into two sections, the upper section being movable from and against the lower section, said die having two directly oppositely arranged teeth which project toward each other and are carried by opposite sections respectively of the die and suitably spaced when the upper die-section has been withdrawn the maximum distance from the lower die-section, a suitably actuated substantially vertically movable slide carrying the upper die-section, and a hanger depending from and secured to said slide and arranged at one side of the die and between the die and the point whence the stock is fed toward the die, said hanger being provided with a seat for the stock and having its side which faces the path of the stock arranged next said path but between said path and the ejector-receiving end of the die.

12. In a machine for making hot-pressed hexagonal nut-blanks, a tubular die adapted to receive a plunger at one end and an ejector at the other end, which die has its metal-receiving hole hexagonal in cross-section and is divided into two separable sections each of which carries three walls of said hole, said die having two directly oppositely arranged teeth which project toward each other and are carried by opposite sections respectively of the die and suitably spaced when the die-sections have been separated the maximum distance, the inner side of the tooth of each die-section and one of the outer internal walls of said section being substantially coincident and the other side of said tooth and the other of said walls being substantially parallel, each die-section having its internal wall which is substantially parallel with the outer side of the tooth of said section provided adjacent the other die-section with a recess which extends longitudinally of the die and transversely of the forward end of the path of the hot stock to be operated on and somewhat beyond said path in the direction of the ejector-receiving end of the die and is reduced in depth and width beyond said path in said direction.

13. In a machine for making hexagonal nut-blanks, a substantially horizontally arranged tubular die adapted to receive a plunger at one end and an ejector at the other end, which die has its metal-receiving hole hexagonal in cross-section and is divided horizontally and centrally into two sections each of which carries three walls of said hole, the upper die-section being movable from and against the lower die-section, said die having two directly oppositely arranged teeth which project toward each other and are carried by opposite sections respectively of the die, said teeth being spaced apart far enough when the upper die-section has been withdrawn the maximum distance from the lower die-section to permit the insertion of hot stock endwise between said teeth substantially at a right angle to the aforesaid hole, the inner side of the tooth of each die-section and one side wall of the recess in said section being substantially coincident, the other side of said tooth and the other side wall of said recess being substantially parallel, each die-section having its internal wall which is substantially parallel with the outer side of the tooth of said section provded adjacent the other die-section with a recess which extends longitudinally of the die and transversely of the forward end of the path of the aforesaid stock and somewhat beyond said path in the direction of the ejector-receiving end of the die and is reduced in depth and width beyond said path in said direction.

14. In a machine for making hexagonal nut-blanks, a substantially horizontally arranged tubular die adapted to receive a plunger at one end and an ejector at the other end, which die has its metal-receiving hole hexagonal in cross-section and is divided horizontally and centrally into two sections each of which carries three walls of said hole, the upper die-section being movable from and against the lower die-section, said die having two directly oppositely arranged teeth which project toward each other and are carried by opposite sections respectively of the die and spaced apart far enough when the upper die-section has been withdrawn the maximum distance from the lower die-section to permit the insertion of hot stock endwise between the teeth substantially at a right angle to the aforesaid hole, the inner side of the tooth of each die-section and one side wall of the recess in said section being substantially coincident, the other side of said tooth and the other side wall of said recess being substantially parallel, each die-section having its internal wall which is substantially parallel with the outer side of the tooth of said section provided adjacent the other die-section with a recess which extends longitudinally of the die and transversely of the forward end of the path of the aforesaid stock and somewhat beyond said path in the direction of the ejector-receiving end of the die and is reduced in depth and width beyond said path in said direction, said wall of the upper die-section having a forward beveled end-portion.

15. In a machine for making hot-pressed hexagonal nut-blanks, a tubular die which is hexagonal internally in cross-section and adapted to receive the hot metal piece and divided longitudinally at opposite internal corners thereof into two separable sections each of which carries three of the internal walls of said die and being provided at one end of the die with two oppositely arranged teeth carried by opposite die-sections respectively, one side of the tooth of each die-section and one of the outer internal walls of said section being substantially coincident and the other side of said tooth and the other of said walls being substantially parallel; an endwise movable plunger extending the maximum distance into said die at the aforesaid end of said die, or spaced the maximum distance from said die, according as the plunger is in the one or the other of its extreme positions, and an ejector extending into said die from the opposite end and movable endwise of said die, the ejector being spaced in its most rearward position from the travel of the plunger, said die having its aforesaid sections when they are closed together in contact with each other from the face of the ejector in said position of the ejector to the aforesaid teeth, and the plunger extending in its extreme forward position into said die beyond said teeth.

16. In a machine for making hot-pressed hexagonal nut-blanks, a tubular die which is hexagonal internally in cross-section and adapted to receive the hot metal piece and divided longitudinally at opposite internal corners thereof into two separable sections each of which carries three of the internal walls of the said die and being provided between the face of said die and a point centrally between the ends of said die with two oppositely arranged teeth carried by opposite die-sections respectively, one side of the tooth of each die-section and one of the outer internal walls of said section being substantially coincident and the other side of said tooth and the other of said walls being substantially parallel; a plunger adapted to feed the hot metal piece into the said die from the face-end of said die; a tubular ejector extending into said die from the opposite end and movable endwise of said die and being spaced in its extreme rearward position from the travel of the plunger, and a core arranged centrally and longitudinally of said die and centrally of the ejector, the plunger extending in its extreme forward position into said die beyond the aforesaid teeth, and said core extending forwardly of the face of the ejector in the aforesaid position of the ejector a distance measuring less than the distance between said face and the aforesaid teeth in said position of the ejector.

17. In a machine for making hot-pressed hexagonal nut-blanks, a tubular die which is hexagonal internally in cross-section and adapted to receive the hot metal piece and divided longitudinally at opposite internal corners thereof into two separable sections each of which carries three of the internal walls of the die and being provided between the face of said die and a point centrally between the ends of the die with two oppositely arranged teeth carried by opposite die-sections respectively and spaced upon the requisite separation of said die-sections to permit the insertion of the hot stock endwise between said teeth; a plunger adapted to feed the hot metal piece into said die from the face-end of the said die; a tubular ejector extending into said die from the opposite end and movable endwise of said die, said ejector being spaced in its extreme rearward position from the travel of the plunger, and a core arranged centrally and longitudinally of said die and centrally of the ejector and extending forwardly of the ejector in said position of the ejector, the plunger extending in its extreme forward position into said die beyond said teeth, one side of the tooth of each die-section and one of the outer internal walls of said section being substantially coincident and the other side of said tooth and the other of said walls being substantially parallel, and each die-section being provided at the outer side of its tooth, between said tooth and the core-surrounding portion of the die but next to said path, with a surface arranged to form a lateral abutment for the aforesaid stock when the die-sections are closed together.

In testimony whereof, we sign the foregoing specification, in the presence of two witnesses.

WILLIAM S. BIDLE.
JOSEPH A. COSTELLO.

Witnesses:
B. C. BROWN,
N. L. McDONNELL.